US008270504B2

(12) United States Patent
Choi et al.

(10) Patent No.: US 8,270,504 B2
(45) Date of Patent: Sep. 18, 2012

(54) METHOD FOR CONFIGURING BASIC SIGNAL ALLOCATION UNIT AND METHOD FOR TRANSMITTING SIGNALS USING THE SAME

(75) Inventors: Jin Soo Choi, Gyeonggi-do (KR); Seung Woo Nam, Gyeonggi-do (KR); Jae Hoon Chung, Gyeonggi-do (KR); Jin Sam Kwak, Gyeonggi-do (KR); Han Gyu Cho, Gyeonggi-do (KP); Jong Young Han, Gyeonggi-do (KR); Hyung Ho Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 671 days.

(21) Appl. No.: 12/145,340

(22) Filed: Jun. 24, 2008

(65) Prior Publication Data

US 2009/0122901 A1 May 14, 2009

Related U.S. Application Data

(60) Provisional application No. 60/986,600, filed on Nov. 9, 2007, provisional application No. 60/992,679, filed on Dec. 5, 2007, provisional application No. 60/992,105, filed on Dec. 4, 2007.

(30) Foreign Application Priority Data

Mar. 4, 2008 (KR) .......................... 10-2008-0020055

(51) Int. Cl.
*H04L 1/00* (2006.01)
(52) U.S. Cl. ........................................ 375/260; 375/259
(58) Field of Classification Search .................... 375/267
See application file for complete search history.

(56) References Cited

U.S. PATENT DOCUMENTS 7,471,932 B2 * 12/2008 Wu et al. ........................ 455/91
7,558,293 B2 * 7/2009 Choi et al. .................... 370/509
(Continued)

FOREIGN PATENT DOCUMENTS

WO 2006/068349 6/2006

OTHER PUBLICATIONS

S. Ahmadi et al., "Draft IEEE 802.16m Evaluation Methodology Document", IEEE 802.16 Broadband Wireless Access Working Group, IEEE C802.16m-07/069, Mar. 2007.

(Continued)

*Primary Examiner* — David Ometz
*Assistant Examiner* — Santiago Garcia
(74) *Attorney, Agent, or Firm* — Lee, Hong, Degerman, Kang & Waimey

(57) ABSTRACT

A method for configurating a basic signal allocation unit and a method of transmitting signals using the configured basic signal allocation unit are disclosed. In particular, a basic frequency domain signal allocation unit is configured by considering at least one selected from the group consisting of a signaling overhead, a size of a coherent bandwidth and a number of divisors among specific numbers and an OFDM symbol number corresponding to a multiple of a subframe unit, each of the specific numbers multiplied to a predetermined subcarrier spacing to enable a result value of the multiplication to have a difference smaller than a prescribed threshold from a divisor of a system bandwidth. And, a time domain unit is configured by 1-subframe unit. Accordingly, signaling overhead can be efficiently reduced.

9 Claims, 4 Drawing Sheets

U.S. PATENT DOCUMENTS

| | | |
|---|---|---|
| 2004/0114566 A1* | 6/2004 | Lim et al. ............... 370/349 |
| 2005/0063345 A1 | 3/2005 | Wu et al. |
| 2006/0165131 A1 | 7/2006 | Sebire |
| 2007/0202816 A1* | 8/2007 | Zheng ................... 455/91 |
| 2007/0280166 A1* | 12/2007 | Jung et al. ............. 370/331 |
| 2008/0089223 A1* | 4/2008 | Wu et al. ............... 370/209 |
| 2008/0125048 A1* | 5/2008 | Pi ........................... 455/63.1 |
| 2008/0205532 A1* | 8/2008 | Park et al. ............. 375/260 |
| 2008/0212514 A1* | 9/2008 | Chen ..................... 370/315 |
| 2008/0212543 A1* | 9/2008 | Ban ....................... 370/336 |
| 2008/0227386 A1* | 9/2008 | Dayal et al. ........... 455/7 |
| 2008/0316913 A1* | 12/2008 | Kim et al. ............. 370/210 |
| 2009/0047957 A1* | 2/2009 | Westerberg ........... 455/436 |
| 2009/0080569 A1* | 3/2009 | Han et al. .............. 375/316 |
| 2010/0020890 A1* | 1/2010 | Choi et al. ............ 375/260 |
| 2010/0166090 A1* | 7/2010 | Ho ......................... 375/260 |

OTHER PUBLICATIONS

"3rd Generation Partnership Project; Technical Specification Group Radio Access Network; Evolved Universal Terrestrial Radio Access (E-UTRA); Physical Channels and Modulation (Release 8)", 3GPP TS 36.211 V1.3.0, Aug. 2007.

\* cited by examiner

METHOD FOR CONFIGURING BASIC SIGNAL ALLOCATION UNIT AND METHOD FOR TRANSMITTING SIGNALS USING THE SAME

CROSS-REFERENCE TO RELATED APPLICATIONS

This application also claims the benefit of U.S. Provisional Application Ser. Nos. 60/986,600, filed on Nov. 9, 2007, 60/992,679, filed on Dec. 5, 2007 and 60/992,105, filed on Dec. 4, 2007, the contents of which are hereby incorporated by reference herein in their entirety.

This application claims the benefit of the Korean Patent Application No. 10-2008-020055, filed on Mar. 4, 2008, which is hereby incorporated by reference as if fully set forth herein.

BACKGROUND OF THE INVENTION

1. Field of the Invention

The present invention relates to a method for configurating a basic signal allocation unit and a method of transmitting signals using the configurated basic signal allocation unit.

2. Discussion of the Related Art

Generally, there exists a basic unit of resource allocation for signal transmission per communication system. In case of IEEE 802.16e system, a slot is defined as a signal transmission unit. In this case, the slot is a basic data transport unit and can be named 'minimum resource block'.

The slot in IEEE 802.16e system is described as follows.

First of all, a slot in OFDMA physical layer of IEEE 802.16e system is regulated on both a time domain (e.g., the number of OFDMA symbols) and a frequency domain (e.g., the number of subcarriers) and configurates a data allocation unit. In this case, a definition of OFDMA slot follows OFDMA symbol structure. And, the OFDMA symbol structure may differ in uplink (hereinafter abbreviated as "UL") or downlink (hereinafter abbreviated as "DL"), in FUSC (full usage of subchannels) or PUSC (partial usage of subchannels), or in distributed subcarrier permutation or adjacent subcarrier permutation.

For instance, for DL FUSC and DL selective FUSC using distributed subcarrier permutation, 1 slot can be defined as 1 subchannel*1 OFDMA symbol.

For DL PUSC using distributed subcarrier permutation, 1 slot can be defined as 1 subchannel*2 OFDMA symbols.

For UL PUSC, DL TUSC (tile usage of subchannels) 1 and TUSC 2 using distributed subcarrier permutation, 1 slot can be defined as 1 subchannel*2, 3 or 6 OFDMA symbols.

FIG. 1 is a diagram for 2-dimensional resource allocation concept in OFDMA of IEEE 802.16e system.

Referring to FIG. 1, in OFDMA of IEEE 802.16e system, a data area becomes a 2-dimensional area consisting of a group 101 of adjacent subchannels and a group 102 of adjacent OFDMA symbols. All resource allocations refer to logical subchannels, and a subchannel offset shown in FIG. 1 becomes a frequency domain reference of resource allocation.

Thus, the 2-dimensional resource allocation of IEEE 802.16e system can be visualized as FIG. 1.

Meanwhile, a distribution method of resource areas supporting each permutation method is explained as follows.

FIG. 2 is a conceptional diagram for a case that resource areas supporting each permutation method are separated on a time axis (left in FIG. 2) and a case that resource areas supporting each permutation method coexist in a specific time (right in FIG. 2).

In the above-mentioned IEEE 802.16e system, a different data allocation structure and a different pilot structure are designed per permutation method (distribution/AMC) and used. This is because the permutation method in the IEEE 802.16e system, as shown in the left side of FIG. 2, is separated on a time axis and because a structure is designed to be optimized for each different permutation method. If various permutation methods, as shown in the right side of FIG. 2, coexist on a certain time instance, i.e., if a user is able to use various permutation methods in a specific time, a single unified basic data allocation structure and a pilot transmission structure would be required.

Meanwhile, in case of a slot used as a basic unit for resource allocation in the IEEE 802.16e system, it can be construed to be relatively small unit in time and frequency domains for supporting small packet service, such as VoIP service. Therefore, it may be disadvantageous because the pilot structure is restricted and overhead increases for signaling even when relatively big packet service is provided.

SUMMARY OF THE INVENTION

Accordingly, the present invention is directed to a method for configurating a basic signal allocation unit and a method of transmitting signals using the configurated basic signal allocation unit that substantially obviate one or more of the problems due to limitations and disadvantages of the related art.

An object of the present invention is to provide a method for configurating a basic signal allocation unit and a method of transmitting signals using the configurated basic signal allocation unit, by which a basic resource allocation unit applicable in common regardless of a distributed/AMC permutation method is proposed in a manner of assuming a system that a user is able to use various permutation methods in a specific time, as shown in the right side of FIG. 2, and by which signals are transceived using the basic resource allocation unit.

Another object of the present invention is to provide a method for configurating a basic signal allocation unit and a method of transmitting signals using the configurated basic signal allocation unit, by which a basic resource allocation unit is configurated to obtain high system efficiency by minimizing signaling overhead.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of transmitting signals, comprising segmenting information bits by a basic resource block unit; mapping each of the information bits segmented by the basic resource block unit to a basic resource block; and transmitting the mapped information bits as a transmission signal, when the basic resource block unit comprises "S" (an natural number) OFDMA symbols corresponding to 1 subframe length or multiple of 1 subframe length in a time domain and "N" (an natural number) subcarriers in a frequency domain, and when said mapping is performed according to either localized or distributed resource allocation, and the basic resource block unit is uniformly used for the localized and the distributed resource allocations, is presented.

Preferably, the 1 subframe length corresponds to 6 OFDMA symbols, and the "S" is either 6 or 12.

And, the "N" may be determined to meet a condition that the "N" multiplied by a predetermined subcarrier spacing corresponds to a predetermined divisor of a system bandwidth. In this case, the predetermined subcarrier spacing may correspond to 10.9375 kHz, the system bandwidth may correspond to one of 5 MHz, 10 MHz and 20 MHz, and the predetermined divisor of the system bandwidth preferably corresponds to 200 kHz.

Thus, the "N" may be either 18 or 9. Preferably, the "S" is 6, and the "N" is 18.

To further achieve these and other advantages and in accordance with the purpose of the present invention, a method of transmitting signals, the method comprising: segmenting information bits by a basic resource block unit; mapping each of the information bits segmented by the basic resource block unit to a basic resource block; and transmitting the mapped information bits as a transmission signal, when the basic resource block unit comprises "S" (a natural number) OFDMA symbols corresponding to 1 subframe length or multiple of 1 subframe length in a time domain and "N" (a natural number) subcarriers in a frequency domain, when said mapping is performed according to either localized or distributed resource allocation, and when the basic resource block unit is used for the localized resource allocations, and a fraction of the basic resource block unit is used for the distributed resource allocations.

Preferably, the "S" is 6, and the "N" is 18. And, in this case, the fraction of the basic resource block unit may comprise 6 OFDMA symbols and 9 subcarriers.

It is to be understood that both the foregoing general description and the following detailed description are exemplary and explanatory and are intended to provide further explanation of the invention as claimed.

Accordingly, the present invention provides the following effects or advantages.

First of all, in case of using a basic signal allocation unit of the present invention, signaling overhead can be significantly reduced while a small packet service can be supported. And, the present invention can obviate the problem for degraded pilot allocation efficiency in previous system. Also, the present invention can obtain high frequency efficiency while maximally using basic specifications of a conventional, thereby it is applicable to a new system and is more likely to obtain backward compatibility.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
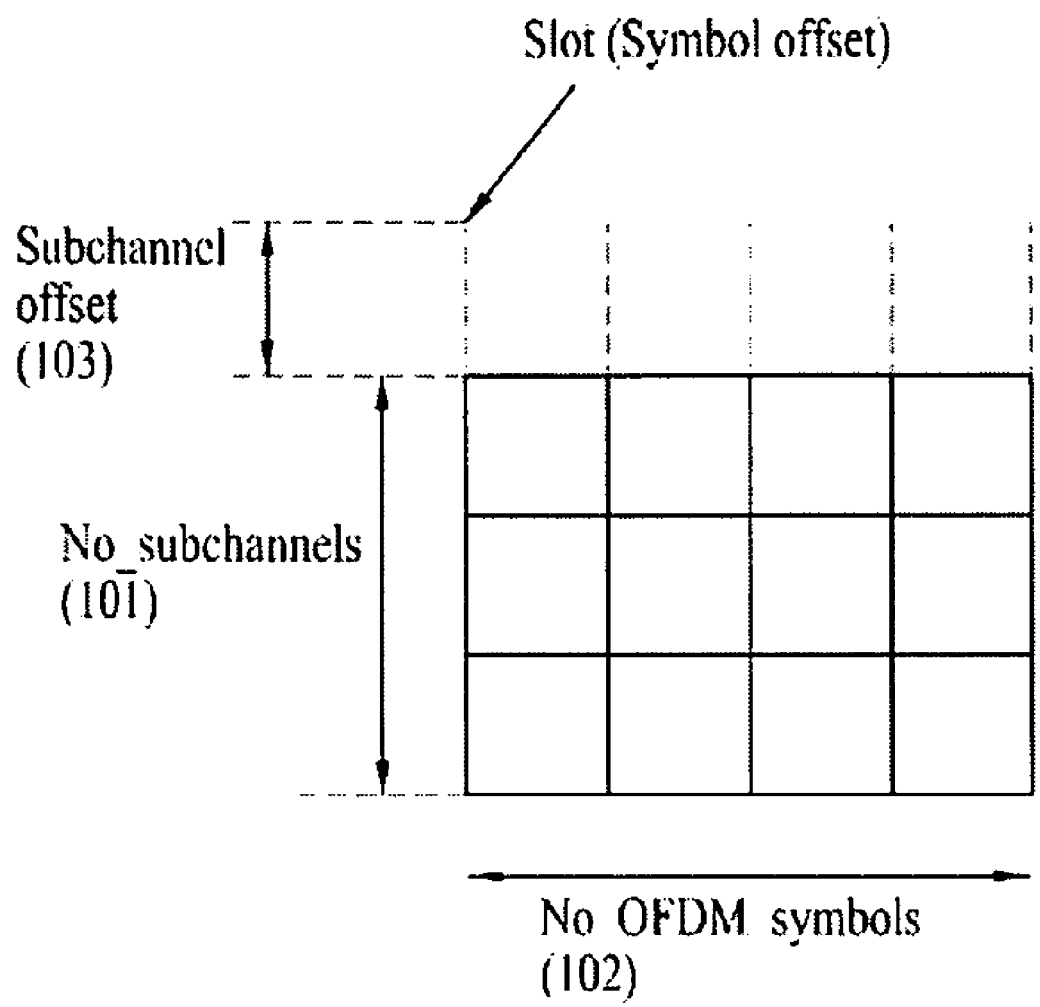
FIG. 1 is a diagram for 2-dimensional resource allocation concept in OFDMA of IEEE 802.16e system.

Reference will now be made in detail to the preferred embodiments of the present invention, examples of which are illustrated in the accompanying drawings. The following detailed description of the present invention non-limits examples of the embodiments of the present invention. For instance, the following description is based on the assumption that IEEE 802.16e system as a related art system and IEEE 802.16m system as an enhanced system. And, the present invention is applicable to a system to enhance various systems such as 3GPP, 3GPP2 and the like.

The following detailed description includes details to provide full understanding of the present invention. It is to be understood by those of ordinary skill in this technological field that the present invention can be implemented without these details. For instance, a detailed numerical value for a resource allocation unit or the like is variable according to a system. And, a detailed principle for deriving each numerical value is identically applicable to this case as well.

To avoid the vagueness of the concept of the present invention, structures and/or devices known in public are omitted but are represented as block diagrams centering on core functions of the structures and devices. Wherever possible, the same reference numbers will be used throughout the drawings to refer to the same or similar parts.

In the following description, 'basic signal allocation unit' indicates a smallest basic structure in various signal allocations including data and is applied as a most basic unit in case of performing data/control information allocation and sub-channelization in performing scheduling for data transport. The basic signal allocation unit is named 'resource block' in the 3GPP LTE system or 'slot' or 'subchannel' in the conventional IEEE 802.16e system.

The signal allocated according to the basic signal allocation unit can include one of various signals such as a control signal, a pilot and the like as well as data. In the following description, it will be named 'basic data allocation unit' for basic signal allocation unit unless there is no confusion with other units. Moreover, the basic signal allocation unit can be named 'resource block', 'basic resource block' or RB like the resource allocation unit of 3GPP LTE system or the like. And, this basic signal allocation unit can be referred as 'physical resource unit (PRU)'.

Meanwhile, in case of designing the above-mentioned basic signal allocation unit, it is preferentially necessary to determine granularity of frequency and time domains.

As mentioned in the foregoing description, a slot as a basic signal allocation unit in IEEE 802.16e system is configurated into a somewhat small unit to support such a small packet service as VoIP. Yet, in case that a basic signal allocation unit is configured small to support the small packet service, signaling overhead may increase. And, in case of a small packet service such as VoIP service and the like, it is more general that the same modulation and coding scheme (MCS) is applied for a predetermined period of time rather than the MCS is changed for each basic signal allocation unit.

In particular, if a basic signal allocation unit is configured small for the small packet service support like the IEEE 802.16e system, signaling overhead may be unnecessarily increased to support all other packet services. Even if a resource allocation unit is configured somewhat bigger, a method of supporting a conventional small packet service sufficiently is possible.

Therefore, a basic signal allocation unit according to the present invention is proposed to be configured into a unit somewhat bigger than the slot of the IEEE 802.16e system.

Figure 3:
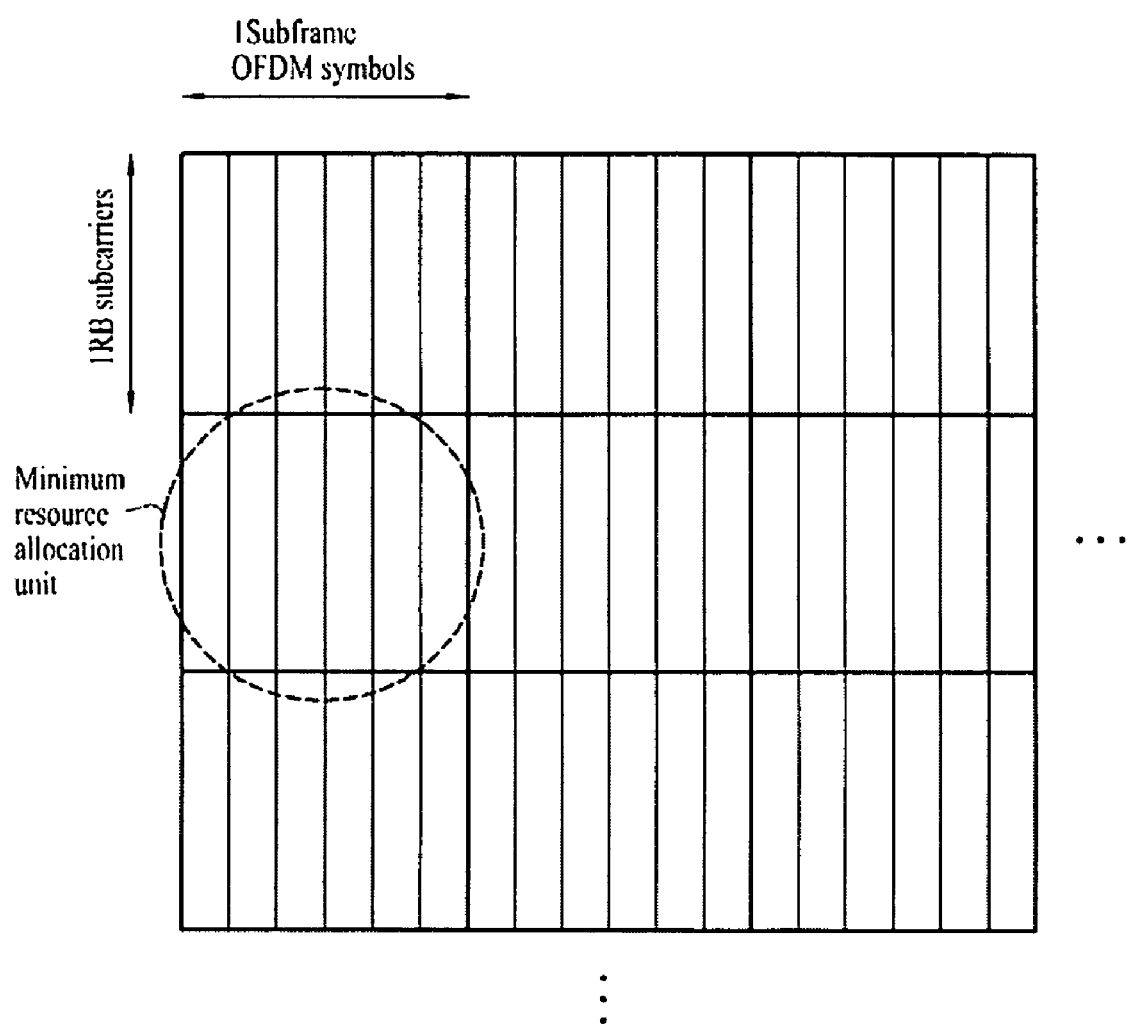
FIG. 3 is a diagram to describe a basic signal allocation structure.

FIG. 3 is a diagram to describe a basic signal allocation structure.

FIG. 3 shows an example that a single frame is constructed with at least one or more subframes. And, each of the subframes is constructed with six OFDM symbols. If a time domain unit of a basic signal allocation structure is determined to have the subframe size shown in FIG. 3, i.e., 6 OFDM symbols, the basic signal allocation structure is determined according to only how many subcarriers on a frequency axis are included in the basic signal allocation structure. So, when the number of OFDM symbols constructing a single subframe is equal to the number of OFDM symbols of a basic signal allocation structure, it can be construed as 1-dimensional resource allocation.

If the time-domain OFDM symbol number of a basic signal allocation structure is different from the OFDM symbol number constructing the subframe shown in FIG. 3 (2-dimensional resource allocation), a basic data allocation structure can be determined by the time-domain OFDM symbol number and the frequency-domain subcarrier number.

According to one preferred embodiment of the present invention, as shown in FIG. 3, a minimum, resource allocation unit has the OFDM symbol number corresponding to a single subframe in a time domain and a resource allocation unit is configured to be determined only by the subcarrier number in a frequency domain. Therefore, it is able to reduce signaling overhead to be smaller than that of the case of configurating a basic signal allocation unit 2-dimensionally.

Meanwhile, as mentioned in the foregoing description, the present invention is applicable to various systems. In particular, the present invention intends to propose a basic signal allocation structure to be applied to IEEE 802.16m system for enhancing the conventional IEEE 802.16e system. In case of IEEE 802.16m system, it is required to support a system according to IEEE 802.16e and WiMAX (Rel. 1.0 or Rel. 1.x) as well as a new system of IEEE 802.16m (see IEEE 802.16m-07/002r4—TGm system requirements document (SRD)). Therefore, it is necessary to refer to numerology of the conventional IEEE 802.16e system in designing a new basic signal allocation unit according to the present invention.

First of all, a subcarrier spacing in the conventional IEEE 802.16e system is 10.9375 kHz. Hence, the number (n) of subcarriers of the basic signal allocation unit or a data allocation unit according to preferred embodiment of the present invention is made to approach a divisor of a system bandwidth when it (n) is multiplied by the subcarrier spacing (10.9375 kHz) (i.e. n*10.9375 kHz % a certain divisor of a system bandwidth). So, it is able to facilitate band-scheduling to be set.

For instance, various system bandwidths (e.g., 5 MHz, 10 MHz, 20 MHz, etc.) can exist as system bandwidths (scalable bandwidth). On the assumption of the system bandwidth, there can exist various candidate subcarrier numbers that can meet the above condition. In the following description, the subcarrier number 12 and the subcarrier number 18 are mainly described.

First of all, the subcarrier number is selected to minimize signaling overhead in the selected candidates in aspect of the above-mentioned band scheduling and to maximize frequency efficiency by considering a coherent bandwidth. And, the subcarrier number is also selected to consider an advantageous aspect in allocating resources distributively within a basic signal allocation unit by having various divisors. The respective aspects will be explained in detail in the following description.

According to one preferred embodiment of the present invention, a frequency domain unit of a basic signal allocation unit is set to 18 subcarriers selected from the above mentioned candidates of 12 and 18 subcarriers. Namely, according to the present embodiment, a basic signal allocation unit is constructed with eighteen subcarriers and six OFDM symbols.

Figure 4:
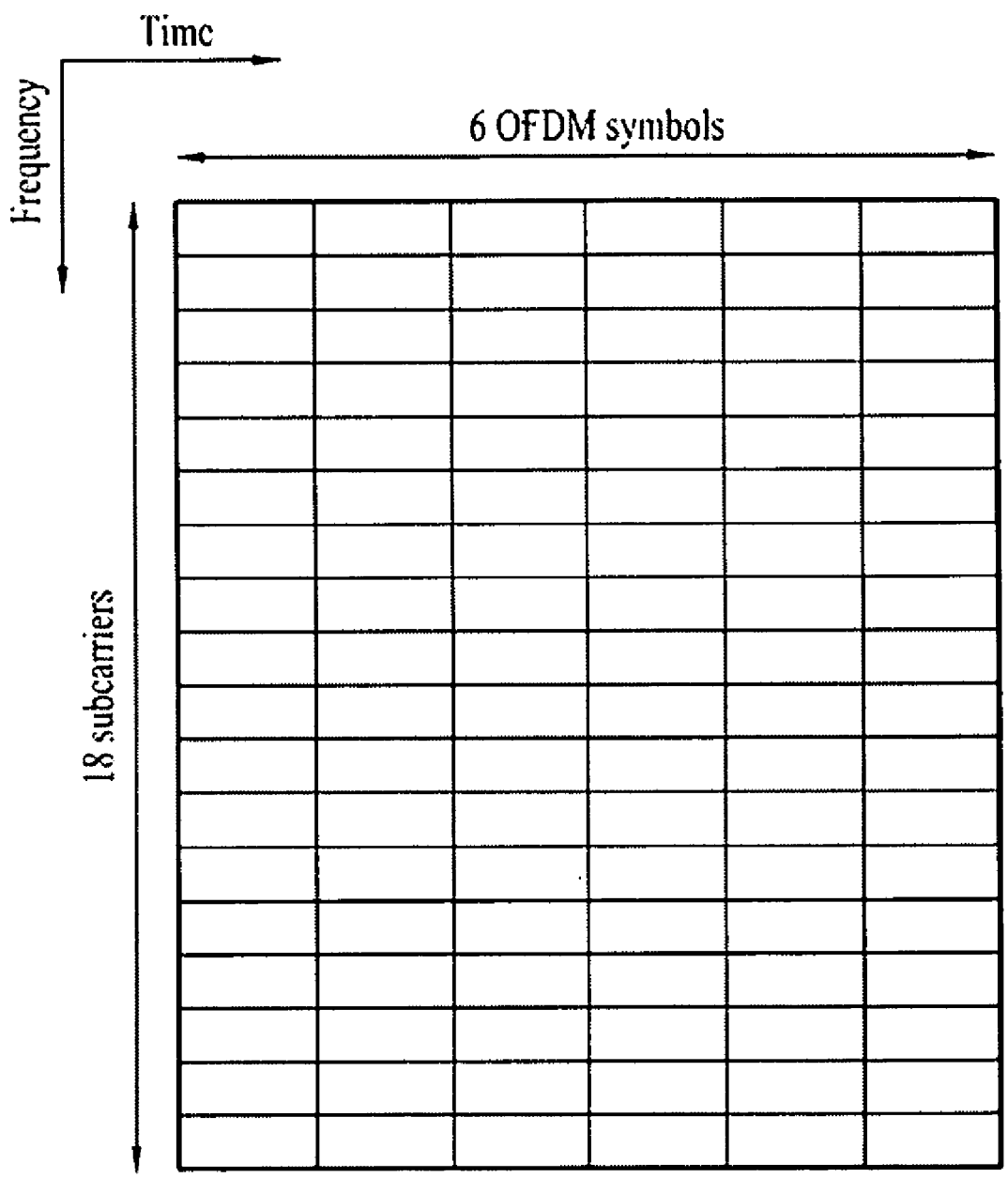
FIG. 4 is a diagram of a basic signal allocation unit according to one preferred embodiment of the present invention.

FIG. 4 is a diagram of a basic signal allocation unit according to one preferred embodiment of the present invention.

Referring to FIG. 4, a basic signal allocation structure or a basic data allocation unit proposed by the present embodiment is able to play a role as the smallest basic structure of data/signal allocation and is also applicable as the smallest basic unit to the case of performing data/control information allocation and resource block channelization of scheduling. Scheduling (i.e., a range to which control information is applied) can be performed per the basic data allocation unit proposed by the present embodiment or per a multiple of the basic data allocation unit.

In the basic signal allocation unit according to the present embodiment, as shown in FIG. 4, total 108 subcarriers exist within a single basic signal allocation unit. And, some of them are used as data subcarriers, pilot subcarriers and control signal area, respectively.

Meanwhile, in case that 18 subcarriers are used as a frequency domain unit of a basic signal allocation unit according to the present embodiment, a frequency domain unit of a basic signal allocation unit becomes about 200 kHz on the assumption of a subcarrier spacing 10.9375 kHz in the IEEE 802.16e system to have a size suitable for band-scheduling. And, scheduling can be more easily performed in case that a basic signal allocation unit is distributively allocated by including many divisors such as 2, 3, 6 and 9.

By defining a time domain unit of a basic signal allocation unit into six OFDM symbols like the present embodiment, if a subframe of a new system (e.g., IEEE 802.16m) is constructed with six OFDM symbols and if a transport frame is divided by a subframe unit, a 1-dimensional resource allocation is possible and overhead can be efficiently reduced. Meanwhile, FIG. 4 shows a case that a time domain unit of a basic signal allocation unit is constructed with six OFDM symbols corresponding to a single subframe according to the present embodiment. And, it is apparent to those skilled in the art that a time domain unit size of the basic resource allocation unit according to the present embodiment can be different from six OFDM symbols until it corresponds to the subframe unit in the time domain.

A signal transmitting method using a basic resource allocation unit is explained as follows.

Figure 2:
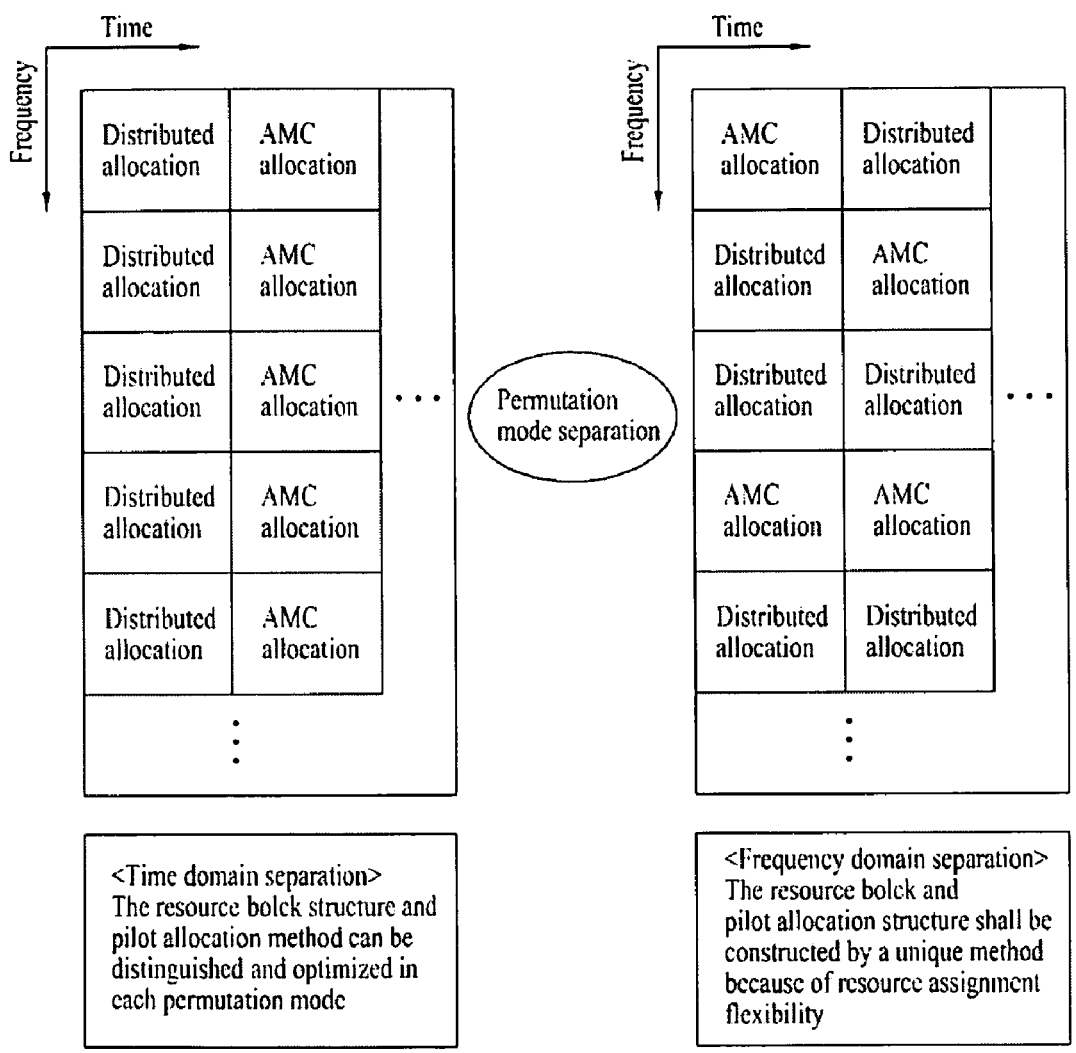
FIG. 2 is a conceptual diagram for a case (left) that resource areas supporting each permutation method are separated on a time axis and a case (right) that resource areas supporting each permutation method coexist in a specific time.

First of all, a process for segmenting information bits to be transported into the aforesaid basic signal allocation units or the basic resource block units is necessary. In this case, the segmentation of the information bit sequence can be performed by a unit (e.g., 18 subcarriers*6 OFDM symbols) greater than that of the segmentation suitable for a slot size of the IEEE 802.16e system. Thus, if the segmentation of the information bits is performed, the segmented information bits can be transported by being mapped to a basic signal allocation unit. In this case, signals transported by being mapped to the basic signal allocation unit can include control information, pilot and the like as well as data. By configuring an allocation and mapping unit greater than that of the IEEE 802.16e system, it is able to reduce signaling overhead. And, a pilot pattern and the like can be defined more efficiently. In this case, the basic signal allocation unit can be uniformly applicable regardless of a permutation method such as distribution/AMC and the like and can have a structure which is advantageous in being applied to the case of design for supporting various permutations methods, a shown in the right side of FIG. 2, in a specific time in a new system (e.g., IEEE 802.16m system). Namely, in the structure shown in the right side of FIG. 2, in case that a basic signal allocation structure according to the present embodiment is applied as the unified smallest transmission unit regardless of the permutation method, it can have large flexibility.

That is, the logical resource unit (LRU) may have the same size of the physical resource unit (PRU) and may be the basic unit for both distributed and localized resource allocation. However, for some cases, the LRU may have different size in the frequency domain. That is, for some cases, the LRU for localized allocation may have the same size of the PRU, and the LRU for distributed allocation may have the same size of the PRU or the fraction size (½, ⅓, ⅙ or ⅑) of the PRU. Because, as stated above, the size of the basic signal block is configured to have many divisors (such as 2, 3, 6 and 9), this type of resource allocation can be easily supported by the definition of the PRU according to the present invention. In one embodiment of the present invention, when the basic signal allocation unit (or PRU) comprising 6 OFDMA symbols and 18 subcarriers is proposed, the allocation unit (i.e. LRU) for distributed resource allocation comprising either same number of subcarriers (6 OFDMA symbols*18 subcarriers) or ½ number of subcarriers (6 OFDMA symbols*9 subcarriers) is proposed.

Meanwhile, as mentioned in the foregoing description, a basic signal allocation unit proposed according to the present embodiment may establish a base in setting a data and pilot subcarrier allocating method within a basic signal allocation unit as well as such a general method as the signal transmitting method. In this case, the data and pilot subcarrier allocation method within the basic signal allocation unit can be differently applied according to a detailed pilot number and a control signal allocation method. In particular, a basic signal allocation structure is constructed with 18 subcarriers and 6 OFDM symbols. And, data and pilot subcarrier number or pilot pattern within the basic signal allocation structure can be differently applied.

Therefore, the number of data subcarriers within the basic signal allocation structure or the data allocation structure can be designed to match an input size (a multiple of 48 or 96) of CTC (convolutional turbo codes) module or not to (e.g., a rate-matching module is available).

Table 1 represents an example of a subcarrier configuration usable for a case of applying a basic signal allocation unit according to the present embodiment.

TABLE 1

|  | 2048 FFT size | 1024 FFT size | 512 FFT size |
|---|---|---|---|
| Number of used subcarriers | 1729 (DC included) | 865 | 433 |
| Left/Right guard subcarriers | 160/159 | 80/79 | 40/39 |
| Number of subchannels (resource blocks) | 96 | 48 | 24 |

Meanwhile, Table 2 shows an example of a subcarrier configuration usable for a case of configurating a frequency domain unit of a basic signal allocation unit with 12 subcarriers according to another embodiment of the present invention.

TABLE 2

|  | 2048 FFT size | 1024 FFT size | 512 FFT size |
|---|---|---|---|
| Number of used subcarriers | 1729 (DC included) | 865 | 433 |
| Left/Right guard subcarriers | 160/159 | 80/79 | 40/39 |
| Number of subcarriers (resource blocks) | 144 | 72 | 36 |

Meanwhile, in the following description, a case of using a basic signal allocation unit constructed with 18 subcarriers*6 OFDM symbols according to one preferred embodiment of the present invention and a case of configurating a basic signal allocation unit according to another embodiment are compared to each other and explained.

First of all, effects of a case of using a basic signal allocation unit constructed with 18 subcarriers*6 OFDM symbols according to one preferred embodiment of the present invention are summarized and described as follows.

First of all, a frequency subcarrier size (18 subcarriers) suitable for band scheduling is applied as a frequency unit of a basic signal allocation unit. Hence, signaling overhead in resource allocation is minimized and optimal band scheduling performance can be provided. For instance, in case that the OFDM symbol number of a basic signal allocation unit is fixed to 6, a test result from being compared to an embodiment for setting a frequency domain unit to a size of 12 subcarriers can be explained as follows.

TABLE 3

| System Configuration (SubC, OFDM Symb) | Number of Used Subcarriers (1024 FFT) | Normalized Average Sector Spectral Efficiency |
|---|---|---|
| Reference system (802.16e AMC) | 864 (DC exclusive) | 1 |
| RB (12, 6) AMC | 864 | 1.057 (compared to reference system) |
| RB (18, 6) AMC | 864 | 1.058 (compared to reference system) |

TABLE 4

| System Configuration (SubC, OFDM Symb), $S_d$: RB division | Number of Used Subcarriers (1024 FFT) | Normalized Average Sector Spectral Efficiency (considering on the amount of used subcarriers) |
|---|---|---|
| Reference system (802.16e PUSC) (SubC.-level distributed) | 840 (DC exclusive) | 1 |
| RB (12, 6) block-based distributed ($S_d = 2$) | 840 | 1.034 (compared to reference system) |
| RB (18, 6) block-based distributed ($S_d = 2$) | 810 | 1.064 (compared to reference system) |

In Table 3, RB (12,6) AMC indicates a case of configurating a basic signal allocation unit with 12 subcarriers*6 OFDM symbols according to one embodiment of the present invention and using AMC mode. And, RB (18,6) AMC indicates a case of configurating a basic signal allocation unit with 18 subcarriers*6 OFDM symbols according to one embodiment of the present invention and using AMC mode.

In Table 4, 'RB (12,6) block-based distributed ($S_d=2$)' indicates a case of configurating a basic signal allocation unit with 12 subcarriers*6 OFDM symbols according to one embodiment of the present invention and using a block-based distributed mode of dividing resource blocks by 2. And, 'RB (18,6) block-based distributed ($S_d$=2)' indicates a case of configurating a basic signal allocation unit with 18 subcarriers*6 OFDM symbols according to one preferred embodiment of the present invention and using a block-based distributed mode of dividing resource blocks by 2.

Based on this, the embodiment of using the 18-subcarier size has the number resource blocks on whole frequency band, which is smaller than that of the embodiment of using 12-subcarrier size. Therefore, it is advantageous in that resource allocation signaling overhead is required less. Yet, it can be also confirmed that band-AMC performance is maintained almost same through the result of Table 3.

Further, according to the result of Table 4, distributed permutation mode is applied to the case of using the 18-subcarrier size, it can be observed that better performance can be obtained.

Meanwhile, it is able to assume the subcarrier number equal to or greater than the 18-subcarrier size. If so, AMC mode performance becomes poorer than that of the case of using the 18 subcarriers. Moreover, it is able to assume a case of using a subcarrier size smaller than the 12-subcarrier size. If so, it is disadvantageous in that signaling overhead for resource allocation is raised.

In case of considering the advantage of having many divisors, the structure corresponding to the above-mentioned case of using 18 subcarriers according to a preferred embodiment of the present invention may be most preferable.

The test environments for Table 3 and Table 4 correspond to the system environment currently discussed by IEEE 802.16m standardization committee and provide the criteria of system level simulations thereof. And, the criteria are represented by Table 5. Compared to pilot overhead of the conventional IEEE 802.16e system, if pilot overhead is reduced to 5.56%, further enhanced performance can be provided using the basic signal allocation unit according to the present embodiment.

TABLE 5

| Subject | Description | Basic System Assumption | Proposed Specific Assumptions (matters to be provided by a proposer) |
|---------|-------------|------------------------|----------------------------------|
| Basic modulation | Modulation schemes for data and control | QPSK, 16QAM, 64QAM | Same |
| Duplexing scheme | TDD, HD-FDD or FD-FDD | TDD | Same |
| Sub-channelization | Subcarrier permutation | PUSC | PUSC/Block-based distributed permutation ($S_d$ = 2)/AMC |
| Resource allocation granularity | Smallest unit of resource allocation | PUSC: Non-STC: 1 slot, STC: 2 slots (1 slot = 1 subchannel × 2 OFDMA symbols) | PUSC: 1 slot 1 slot = 1 subchannel × 2 OFDM symbols Reference AMC: 1 slot 1 slot = 1 subchannel × 3 OFDM symbols Other all the RB structures: 1 slot |

TABLE 5-continued

| Subject | Description | Basic System Assumption | Proposed Specific Assumptions (matters to be provided by a proposer) |
|---------|-------------|------------------------|----------------------------------|
| Downlink pilot structure | Pilot structure, density, etc. | specific to PUSC sub-channelization scheme | 1 slot = 1 subchannel × 6 OFDM symbols Specific to PUSC sub-channelization scheme/reference AMC Other all the RB structures: Common to AMC/Distributed sub-channelization scheme |
| Multi-antenna transmission format | Multi-antenna configuration and transmission scheme | MIMO 2 × 2 (adaptive MIMO switching matrix A & matrix B) Beamforming (2 × 2) | SIMO (1 × 2) |
| Receiver structure | MMSE/ ML/MRC/ Interference Cancellation | MMSE (matrix B data zone) MRC (MAP, matrix A data zone) | MMSE |
| Data channel coding | Channel coding schemes | Convolutional turbo coding (CTC) | Same |
| Control channel coding | Channel coding schemes and block sizes | Convolutional turbo coding (CTC), convolutional coding (CC) for FCH only | N/A |
| Scheduling | Demonstrate performance/ fairness criteria in accordance to traffic matrix | Proportional fairness for full buffer data only, 10 active users per sector, fixed control overhead of 6 symbols, 22 symbols for data, 5 partitions of 66 slots each, latency time scale 1.5 s | 18 symbols for data, 5 partitions for distributed mode and 6 partitions for AMC mode Others same |
| Link adaptation | Modulation and coding schemes (MCS), CQI feedback delay/ error | QPSK (1/2) with repetition 1/2/4/6, QPSK (3/4), 16QAM (1/2), 16QAM(3/4), 64QAM (1/2), 64QAM (2/3), 64QAM (3/4), 64QAM (5/6), CQI feedback delay of 3 frames/CQI feedback error [TBD] | QPSK (1/2) with repetition 1/2/4/6, QPSK (3/4), 16QAM (1/2), 16QAM(3/4), 64QAM (2/3), 64QAM (3/4), 64QAM (5/6), No CQI feedback error Others same |
| Link to system mapping | EESM/MI | MI (RBIR) ** | MMIB |
| HARQ | Chase combining/ incremental redundancy, | Chase combining asynchronous, non-adaptive, 1 frame ACK/NACK | No ACK/NACK error Others same |

TABLE 5-continued

| Subject | Description | Basic System Assumption | Proposed Specific Assumptions (matters to be provided by a proposer) |
|---|---|---|---|
| | Synchronous/ Asynchronous, Adaptive/non-adaptive ACK/ NACK delay, Maximum number of re-transmissions, retransmission delay | delay, ACK/NACK error, maximum 4 HARQ retransmissions, minimum retransmission delay 2 frames *** | |
| Power control | Subcarrier power allocation | Equal power per subcarrier | Same |
| Interference model | Co-channel interference model, fading model for interferers, number of major interferers, threshold, receiver interference awareness | Average interference on used tones in PHY abstraction (refer to section 4.4.8) | Frequency selective interference modeling |
| Frequency reuse | Frequency reuse pattern | 3 sectors with frequency reuse of 1 **** | Same |
| Control signaling | Message/ signaling format, overheads | Compressed MAP with sub-maps | N/A |

In the following description, basic signal allocation units according to other embodiments of the present invention except the above-mentioned unit of 18 subcarriers*6 OFDM symbols are explained.

First of all, another embodiment of the present invention proposes a method of using a basic signal allocation unit having 18-subcarrier size*12-OFDM symbol size.

In case of uplink transmission frame/subframe, it may be necessary to define a subframe (or a set of subframes) longer than a downlink transmission due to various reasons. In this case, the present embodiment proposes that the OFDM symbol number of a basic signal allocation structure is defined as 12 that is a multiple of 6. If the present embodiment is applied, a smallest signal allocation unit for transmitting and scheduling data (or a control signal) has the structure of 18 subcarriers*12 OFDM symbols. A single basic signal allocation structure is constructed with total 216 subcarriers, which are divided into data subcarriers, pilot subcarriers and control channel subcarriers.

A further embodiment of the present invention proposes a method of using a basic signal allocation unit having 12-subcarrier size*12-OFDM symbol size.

As mentioned in the above description, In case of uplink transmission frame/subframe, it may be necessary to define a subframe (or a set of subframes) longer than a downlink transmission due to various reasons. Therefore, the OFDM symbol number of a basic signal allocation structure is defined as 12 and 12 subcarriers can be used as a frequency domain unit.

According to this embodiment, a single basic signal allocation structure is constructed with total 144 subcarriers, which are divided into data subcarriers, pilot subcarriers and control channel subcarriers.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

A basic signal allocation unit and a signal transmitting method using the same according to each embodiment of the present invention has a structure suitably applicable to IEEE 802.16m system enhanced from IEEE 802.16e system. Yet, the present invention is applicable to various systems for enhancing various wireless communication systems by the same principles as well as the IEEE 802.16m system.

What is claimed is:

1. A method of transmitting signals, the method comprising:
   segmenting information bits by a basic resource block unit to produce a plurality of basic resource block units;
   mapping each of the information bits, for each of the plurality of basic resource block units, to a respective basic resource block; and
   mapping information bits of some of the plurality of the basic resource block units according to a localized resource allocation and mapping information bits of other ones of the plurality of the basic resource block units according to a distributed resource allocation,
   transmitting the mapped information bits as a transmission signal,
   wherein the basic resource block unit comprises "S" consecutive OFDMA symbols corresponding to 1 subframe length in a time domain and "N" consecutive subcarriers in a frequency domain,
   wherein the localized resource allocation is defined by allocating the information bits of one basic resource block unit of the plurality of resource block units sequentially over adjacent subcarriers of the "N" consecutive subcarriers,
   wherein the distributed resource allocation is defined by allocating the information bits of one basic resource block unit of the plurality of resource block units non-sequentially over adjacent subcarriers of the "N" consecutive subcarriers;
   wherein "N" is equal to either 18 or 9, and
   wherein "S" is a natural number.

2. The method according to claim 1,
   wherein the 1 subframe length corresponds to 6 OFDMA symbols, and
   wherein "S" is equal to either 6 or 12.

3. The method according to claim 1, wherein "N" is determined to meet a condition that "N" multiplied by a predetermined subcarrier spacing corresponds to a predetermined divisor of a system bandwidth.

4. The method according to claim 3,
   wherein the predetermined subcarrier spacing corresponds to 10.9375 kHz, and
   wherein the system bandwidth corresponds to 5 MHz, 10 MHz or 20 MHz.

5. The method according to claim 3, wherein the predetermined divisor of the system bandwidth corresponds to 200 kHz.

6. The method according to claim 1,
   wherein "S" is equal to 6, and
   wherein "N" is equal to 18.

7. A method of transmitting signals, the method comprising:
- segmenting information bits by a basic resource block unit to produce a plurality of basic resource block units;
- mapping each of the information bits, for each of the plurality of basic resource block units, to a respective basic resource block; and
- mapping information bits of some of the plurality of the basic resource block units according to a localized resource allocation and mapping information bits of other ones of the plurality of the basic resource block units according to a distributed resource allocation,
- transmitting the mapped information bits as a transmission signal,
- wherein the basic resource block unit comprises "S" consecutive OFDMA symbols corresponding to 1 subframe length in a time domain and "N" consecutive subcarriers in a frequency domain,
- wherein the localized resource allocation is defined by allocating the information bits of one basic resource block unit of the plurality of resource block units sequentially over adjacent subcarriers of the "N" consecutive subcarriers,
- wherein the distributed resource allocation is defined by allocating the information bits of one basic resource block unit of the plurality of resource block units non-sequentially over adjacent subcarriers of the "N" consecutive subcarriers;
- wherein a fraction of the basic resource block unit is used for the distributed resource allocation,
- wherein "N" is equal to either 18 or 9, and
- wherein "S" is a natural number.

8. The method according to claim 7,
- wherein "S" is equal to 6, and
- wherein "N" is equal to 18.

9. The method according to claim 8, wherein the fraction of the basic resource block unit comprises 6 OFDMA symbols and 9 subcarriers.

* * * * *